(12) United States Patent
Oishi

(10) Patent No.: US 7,370,070 B2
(45) Date of Patent: May 6, 2008

(54) DATA SHARING METHOD, REQUEST PROCESSING METHOD, PROGRAM, AND APPARATUS

(75) Inventor: Kazuomi Oishi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 778 days.

(21) Appl. No.: 10/930,958

(22) Filed: Sep. 1, 2004

(65) Prior Publication Data
US 2005/0102516 A1    May 12, 2005

(30) Foreign Application Priority Data
Sep. 5, 2003   (JP)   ............................. 2003-314000

(51) Int. Cl.
*G06F 15/16* (2006.01)
(52) U.S. Cl. ...................... 709/200; 713/153; 713/170; 713/171; 380/30; 380/278
(58) Field of Classification Search ................ 713/150, 713/153, 168, 170, 171; 380/28, 30, 277, 380/278; 709/203
See application file for complete search history.

(56) References Cited

U.S. PATENT DOCUMENTS

| | | | | |
|---|---|---|---|---|
| 5,046,094 A | | 9/1991 | Kawamura et al. | 380/46 |
| 5,369,708 A | | 11/1994 | Kawamura et al. | 380/30 |
| 5,491,749 A | * | 2/1996 | Rogaway | 713/171 |
| 5,825,890 A | * | 10/1998 | Elgamal et al. | 713/151 |
| 5,832,092 A | | 11/1998 | Okuda et al. | 380/49 |
| 5,973,791 A | | 10/1999 | Yamamuro et al. | 358/403 |
| 5,987,131 A | * | 11/1999 | Clapp | 713/171 |
| 6,154,841 A | | 11/2000 | Oishi | 713/180 |
| 6,298,153 B1 | | 10/2001 | Oishi | 382/186 |
| 6,385,318 B1 | | 5/2002 | Oishi | 380/262 |
| 6,483,921 B1 | * | 11/2002 | Harkins | 380/286 |
| 6,496,932 B1 | | 12/2002 | Trieger | 713/168 |
| 6,766,453 B1 | * | 7/2004 | Nessett et al. | 713/171 |
| 6,829,356 B1 | * | 12/2004 | Ford | 380/44 |
| 6,944,762 B1 | * | 9/2005 | Garrison | 713/160 |
| 6,990,468 B1 | * | 1/2006 | Berson et al. | 705/52 |
| 7,047,408 B1 | * | 5/2006 | Boyko et al. | 713/169 |
| 7,051,199 B1 | * | 5/2006 | Berson et al. | 713/150 |
| 7,076,656 B2 | * | 7/2006 | MacKenzie | 713/171 |
| 2001/0055388 A1 | * | 12/2001 | Kaliski, Jr. | 380/30 |
| 2002/0067832 A1 | * | 6/2002 | Jablon | 380/277 |
| 2002/0144118 A1 | * | 10/2002 | Maruyama | 713/170 |
| 2002/0194478 A1 | * | 12/2002 | MacKenzie | 713/171 |

(Continued)

OTHER PUBLICATIONS

Harkins D. et al., "The Internet Key Exchange (IKE)", RFC 2409, Nov. 1998.*

(Continued)

*Primary Examiner*—Oanh Duong
(74) *Attorney, Agent, or Firm*—Fitzpatrick, Cella, Harper & Scinto

(57) ABSTRACT

A data sharing apparatus shares first data with a communication partner. The data sharing apparatus obtains second data from third data by using server-aided computation, and generates fourth data to be used by the communication partner for obtaining the first data, from the second data and fifth data. The data sharing apparatus obtains the first data to be shared with the communication partner by using server-aided computation from sixth data generated from the third data and seventh data.

17 Claims, 11 Drawing Sheets

U.S. PATENT DOCUMENTS

| | | | |
|---|---|---|---|
| 2003/0093694 A1* | 5/2003 | Medvinsky et al. | 713/201 |
| 2003/0172278 A1* | 9/2003 | Farnham et al. | 713/176 |
| 2003/0229789 A1* | 12/2003 | Morais et al. | 713/171 |
| 2003/0236897 A1 | 12/2003 | Shitano et al. | 709/229 |
| 2004/0151390 A1* | 8/2004 | Iwamura | 382/236 |
| 2004/0158715 A1* | 8/2004 | Peyravian et al. | 713/171 |
| 2005/0005114 A1* | 1/2005 | Medvinsky | 713/168 |
| 2006/0143453 A1* | 6/2006 | Imamoto et al. | 713/169 |

OTHER PUBLICATIONS

Kawamura et al., "Fast server-aided secret computation protocols for modular exponentiation", IEEE, vol. 11, issue 5, pp. 778-784, Jun. 1993.*

Shimbo et al., "Factorisation attack on certain server-aided computation protocols for the RSA secret transformation", Electronics Letters, vol. 28, issue 17, pp. 1387-1388, Aug. 1990.*

Burns et al., "Parameter selection for server-aided RSA computation schemes", IEEE, vol. 43, issue 2, pp. 163-174, Feb. 1994.*

Rescorla E., "Diffie-Hellman Key Agreement Method", RFC 2631, Jun. 1999.*

T. Matsumoto, et al., "Smart Cards can Compute Secret Heavy Functions with Powerful Terminals", The 10th Symposium on Information Theory and Its Applications, Enoshima Islands, Japan, Nov. 19-21, 1987, pp. 17-22. (whole English translation included).

T. Matsumoto, et al., "Speeding Up Secret Computations with Insecure Auxiliary Devices", Advances in Cryptology—CRYPTO '88, pp. 497-506, Springer-Verlag (1988).

N. Koblitz, A Course in Number Theory and Cryptography, 2nd Edition, pp. 167-170, Springer-Verlag (1994).

U.S. Appl. No. 09/222,846, filed Dec. 30, 1998.

* cited by examiner

DATA SHARING METHOD, REQUEST PROCESSING METHOD, PROGRAM, AND APPARATUS

FIELD OF THE INVENTION

The present invention relates to a sharing method of sharing data with a communication partner, a processing method of processing a computation request, a program, and an apparatus.

BACKGROUND OF THE INVENTION

The advent of IPv6 makes it possible to connect to a network an apparatus which is conventionally unable to connect to a network. An example is an end-user digital camera which can be directly connected to the Internet.

A case in which an IPv6 communication apparatus performs cryptographic communication by using IPsec will be explained below.

IPsec is a protocol such that two apparatuses on the Internet sharing secret data unknown to anybody else perform encryption and authentication on the basis of this secret data. To communicate with each other, these two apparatuses must securely share the secret data, their IPv6 addresses, and the like. Data such as the secret data and IPv6 addresses is called SA (Security Association). A protocol by which SA is securely shared is called IKE (Internet Key Exchange), and defined in RFC2409 "The Internet Key Exchange (IKE)". "Securely sharing SA" is to reliably share SA only with an intended partner, and requires reliable authentication of the partner. IKE uses the Diffie-Hellman public-key distribution scheme (to be referred to as DH hereinafter) as a secret data sharing method, and four authentication methods are defined.

Of processes performed during the execution of IKE, the process of DH has the heaviest load. In this process of DH, modular exponentiation of a large integer (e.g., 512 bits in around 1990, and desirably about 1,024 bits in recent years) particularly has a heavy load. Modular exponentiation is to calculate A which satisfies $A=B\{C\}$ mod D, i.e., calculate a residue A obtained by dividing $B^C$ by D, from B, C, and D. Note that $B\{C\}$ or $B^C$ mean B to the C-th power. When modular exponentiation is to be performed using a K-bit integer, K+(the number of 1's in the binary representation of the exponent C)−1 modular multiplications are necessary. If K is 512, 767 ($=512+256-1$) modular multiplications are necessary on average.

Apparatuses which communicate by IPv6 do not always have high computation capability like that of the end-user digital camera as described above. If such an apparatus executes IKE, the processing time may take a few minutes, so it is important to reduce this processing time. Note that not only IKE but many public-key cryptography such as DH, RSA cryptosystem, ElGamal encryption scheme, and ElGamal signature scheme require modular exponentiation. To use public-key cryptography, therefore, it is useful to efficiently execute modular exponentiation.

The inverse operation of this modular exponentiation is called the discrete logarithm problem, i.e., given a modulus D, a base B, and a number A, obtaining an exponent C such that $A=B^C$ mod D. If the modulus is large, the discrete logarithm problem is practically unsolvable. This is (one of) the bases of the security of the public-key cryptography described above. As a mathematical setting for implementing DH, it is possible to use a multiplicative group of a finite field, or an elliptic curve over a finite field. Although the following explanation will be made by taking a multiplicative group as an example, the present invention is also effective when an elliptic curve is used.

Research and development are being made on a method by which an apparatus having low computation capability requests an apparatus having high computation capability to perform computations, while hiding secret information necessary for the computations (Tsutomu MATSUMOTO, Koki KATO, Hideki IMAI, "Smart cards can compute secret heavy functions with powerful terminals", The 10th Symposium on Information Theory and Its Applications (1987), Tsutomu MATSUMOTO, Koki KATO, Hideki IMAI, "Speeding up secret computations with insecure auxiliary devices", Advances in Cryptology—CRYPTO '88, pp. 497-506, Springer-Verlag (1988)). Such a method is referred to as server-aided computation (SAC for short), hereinafter.

As a practical example of SAC, RSA cryptosystem's secret transformation (decryption or signature generation) is most typical. In this method, an apparatus (client) having low computation capability has a secret key and requests an apparatus (server) having high computation capability to perform a modular exponentiation using the secret key as an exponent, without revealing the secret key to the server. The modulus is a composite number in RSA cryptosystem's secret transformation, and is a prime number in DH. However, the both are modular exponentiation using a secret key as an exponent.

A plurality of SAC methods for RSA cryptosystem's secret transformation are proposed, and these methods include methods applicable to modular exponentiation of DH. One of the methods (RSA-S1 to be described later) is based on the assumption that the discrete logarithm problem is infeasible and the security of the method is evaluated by the number of possible combinations when the method is broken by exhaustive search of possible combinations. When parameters are so determined that the number of possible combinations is about $10^{20}$, RSA-S1 requires 20 modular multiplications.

Another SAC method for RSA cryptosystem's secret transformation is also proposed (U.S. Pat. No. 5,046,094).

Some of these methods are presumably applicable to modular exponentiation of DH. In these methods, computations performed by a client and computations performed by a server can be executed in parallel, thereby optimally reducing the total processing time even when the computation capabilities or communication line speeds are different. In these methods, a client also performs modular exponentiation. Therefore, if the method is broken by exhaustive search of possible combinations and the number of the possible combinations is about $10^{20}$ (=approximately $2^{67}$), the client must perform modular exponentiation using an exponent of about 67 bits. The average number of modular multiplication is about 100, which is larger than that in the method (RSA-S1) by MATSUMOTO et. al.

Still another SAC method for RSA cryptosystem's secret transformation is also proposed, and this method is presumably applicable to DH (U.S. Pat. No. 5,369,708).

The main purpose of this method is not to leak any secret information necessary for secret transformation, and the processing efficiency of the method is made higher than those of similar conventional methods. However, when the number of bits is 512, a client must perform 100 or more modular multiplication. This number is larger than that in the method (RSA-S1) by MATSUMOTO et. al.

The above SAC methods can be used to request one modular exponentiation.

In DH, however, a modular exponentiation is repeated twice as follows.

A protocol when entities A and B execute DH by using a prime p and a generator g as common parameters will be described below with reference to FIG. 4.

In step S401A, the entity A generates secret information $x\_A$. In step S401B, the entity B generates secret information $x\_B$.

In step S402A, the entity A computes $y\_A=g^{\wedge}(x\_A)$ mod p. In step S403A, the entity A sends $y\_A$ to the entity B.

In step S402B, the entity B computes $y\_B=g^{\wedge}(x\_B)$ mod p. In step S403B, the entity B sends $y\_B$ to the entity A.

In step S404A, the entity A computes $y\_AB=(y\_B)^{\wedge}(x\_A)$ mod p. In step S404B, the entity B computes $y\_BA=(y\_A)^{\wedge}(x\_B)$ mod p.

Since $y\_AB=(g^{\wedge}(x\_B))^{\wedge}(x\_A)$ mod $p=g^{\wedge}(x\_A*x\_B)$ mod $p=(g^{\wedge}(x\_A))^{\wedge}(x\_B)$ mod $p=y\_BA$, $y\_AB=y\_BA$ is used as common secret data to generate an encryption key or the like.

As described above, when DH is executed by using SAC, two modular exponentiations using the same secret information ($x\_A$ or $x\_B$) must be performed by SAC. Taking this point into consideration, when the SAC described above is applied to DH, the processing may be vulnerable to an attack explained below.

Assume that the entity A executes a SAC protocol as a client. As a practical SAC method, the protocol RSA-S1 described in the paper by MATSUMOTO et. al will be explained. The client has integers x, d, and n, and intends to obtain $y=x^{\wedge}d$ mod n. d is a secret of the client, and n is open to the public. The Carmichael function of n is represented as $\lambda(n)$. The process will be described below with reference to FIG. 5.

In step S501, the client randomly generates an integer vector $D=[d\_1, d\_2, \ldots, d\_M]$ and a binary vector $F=[f\_1, f\_2, \ldots, f\_M]$ such that $d=f\_1*d\_1+f\_2*d\_2+ \ldots +f\_M*d\_M$ (mod $\lambda(n)$). M and L are some integers, $d\_i$ is more than or equal to 1 and less than n, and the weight of F (the number of elements having a value of 1, of the elements $f\_1, f\_2, \ldots, f\_M$ of F) is less than or equal to L. The above equation indicates that the residue obtained by dividing d by $\lambda(n)$ equals the residue obtained by dividing the result of $f\_1*d\_1+f\_2*d\_2+ \ldots + f\_M*d\_M$ by $\lambda(n)$.

In step S502, the client sends n, D, and x to the server.

In step S503, the server computes $Z=[z\_1, z\_2, \ldots, z\_M]$ by which $z\_i=x^{\wedge}(d\_i)$ mod n. In step S504, the server sends Z to the client.

In step S505, the client computes $y=y\_M$ as follows. That is, let $y\_0=1$, the client computes $y\_i=y\_(i-1)*z\_i$ mod n if $f\_i=1$, and computes $y\_i=y\_(i-1)$ if $f\_i=0$, for $i=1, 2, \ldots, M$. The client repeats this computation from i=1 to i=M. That is, the client sequentially obtains $y\_1, y\_2, \ldots,$ and obtains $y\_M$ by repeating the computation.

If the modulus n of this protocol is the prime p, $\lambda(n)=\lambda(p)=p-1$, so the protocol can be applied to DH. Accordingly, the client executes the SAC protocol of the modular exponentiation using secret exponent $d=x\_A$ twice. The first one is a SAC protocol for obtaining $y\_A=g^{\wedge}(x\_A)$ mod p, and the second one is a SAC protocol for obtaining $y\_AB=(y\_B)^{\wedge}(x\_A)$ mod p. Since $y\_A$ is a value sent to the entity B in IKE executed on the Internet, any attacker (any third party or a SAC server on the Internet) is probably able to obtain the value of $y\_A$. In principle, therefore, this attacker can obtain F which matches the value of $y\_A$ by exhaustive search of possible combinations from D and Z. The parameters M and L are so set that the number of possible combinations makes it impossible to obtain F within a practical time. As long as the value of $y\_A$ is known, however, it is in principle possible to obtain F (determine at least one combination for $y\_A$).

Assume that an efficient attacking method which breaks the first SAC protocol by exhaustive search is possible in some way. For example, since p and g used in IKE are standardized, a novel distributed algorithm may be found such that each of a large number of computers on the Internet forms a table in which $g^{\wedge}i$ mod p is computed for a number of different i's in advance, and these computers efficiently execute exhaustive search in parallel. If such an attack is possible, as long as the same exponent and the same F are used, the result ($y\_AB$) of the second SAC protocol can be immediately obtained by using D and F which is found by attacking the first SAC protocol. As a consequence, DH is broken. Note that the exhaustive search attack as described above does not hold for the second SAC protocol alone, because in the second SAC protocol the value of the base ($y\_B$) changes every time.

In the method of U.S. Pat. No. 5,046,094 described above, a client itself performs a modular exponentiation by using a secret exponent which the client alone knows. As already pointed out, however, the computation amount is larger than that of RSA-S1 if the security against exhaustive search is equivalent to that of RSA-S1. Accordingly, when this method is applied to DH in which SAC is performed twice, the computation amount also doubles. So, this method does not satisfy the initial purpose (i.e., to allow an apparatus having low computation capability to obtain the result of modular exponentiation without performing any heavy-load computation by itself).

On the other hand, the method of U.S. Pat. No. 5,369,708 described above is the most secure in that no exponent leaks at all, but the computation amount increases. Therefore, when this method is applied to DH in which SAC is performed twice, the computation amount also doubles. So, this method does not satisfy the initial purpose (i.e., to allow an apparatus having low computation capability to obtain the result of modular exponentiation without performing any heavy-load computation by itself).

More specifically, the problems to be solved by the present invention are that SAC by which the amount of computation to be performed by a communication apparatus itself is small has low security, and SAC having high security increases the amount of computation to be performed by a communication apparatus itself.

SUMMARY OF THE INVENTION

It is an object of the present invention to decrease the amount of computation to be performed by a communication apparatus itself and increase the security at the same time.

To achieve the above object, the first invention according to this application generates parameters such that parameters used in the first SAC and parameters used in the second SAC are independent.

When SAC is to be performed twice, the first invention increases the resistance against exhaustive search attack as mentioned earlier.

To achieve the above object, the second invention according to this application uses the result of the first SAC for obtaining the first shared data in the first SAC for obtaining the second shared data.

The second invention saves a communication apparatus the trouble of calculating parameters used in the first SAC for obtaining the second shared data.

In the second invention, the resistance which the first SAC for obtaining the second shared data has against exhaustive search attack is the product of the resistance which the first SAC for obtaining the first shared data has against exhaustive search attack and the resistance which the first SAC for obtaining the second shared data has against exhaustive search attack.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENT

In this embodiment, when a node (node A) communicates with another node (node B) by IPsec using IKE, the node A executes DH by executing a SAC protocol together with a SAC server (node S).

Figure 2:
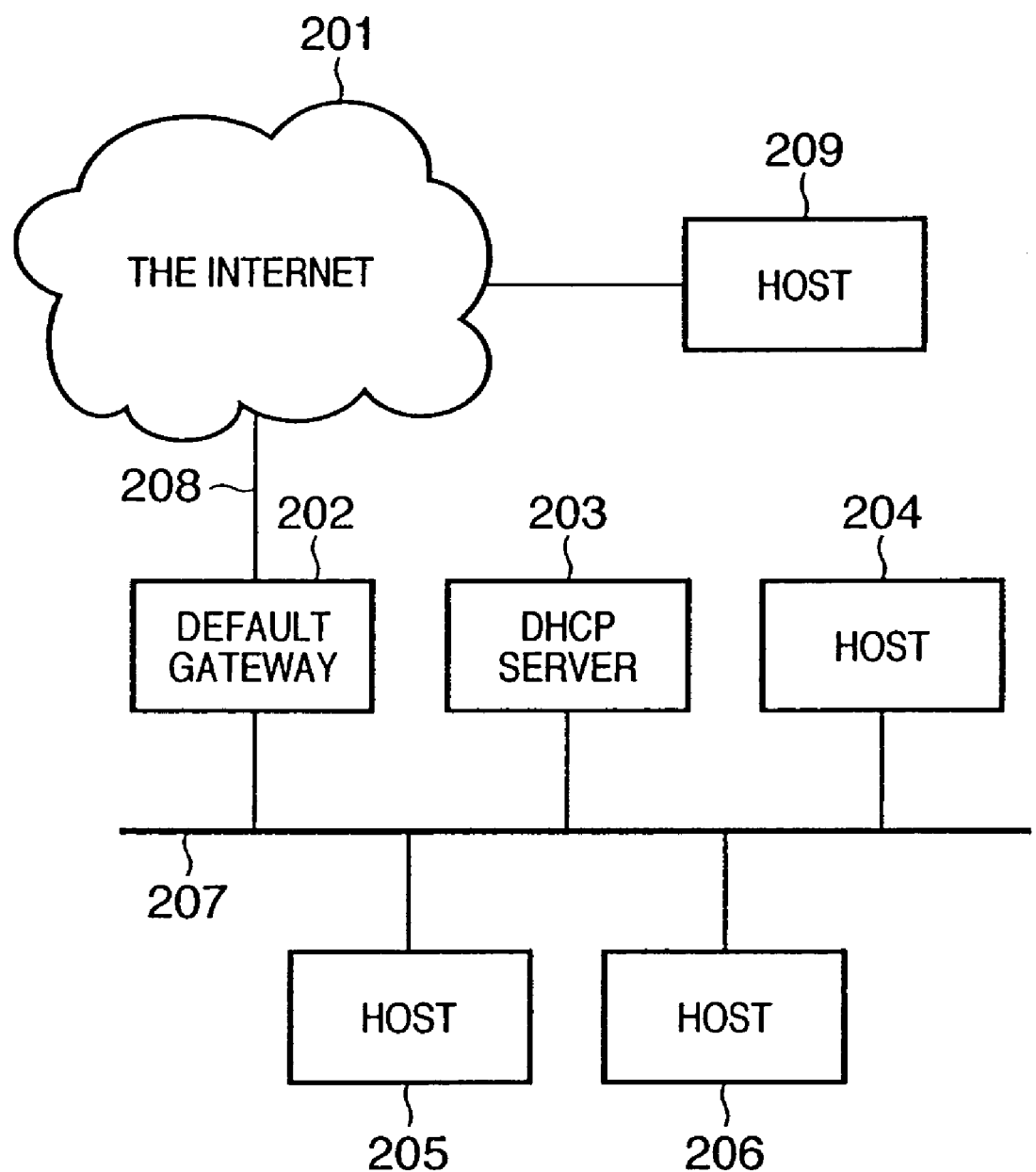
FIG. 2 is a schematic view of an Ethernet (R) LAN.

FIG. 2 schematically shows a connection environment in this embodiment. That is, FIG. 2 shows an environment in which hosts 204, 205, and 206 connected to a LAN access the Internet 201 via a default gateway 202. In this embodiment, each host connects by a link 207, more specifically, the Ethernet (R). A link is a facility or medium which allows a connected apparatus to communicate via it, and is in contact with the lower side of an IP layer. Links other than the Ethernet (R) are a PPP link, X. 25, a frame relay, and an ATM network. An IPv6 apparatus connected to a link is called a node.

Figure 3:
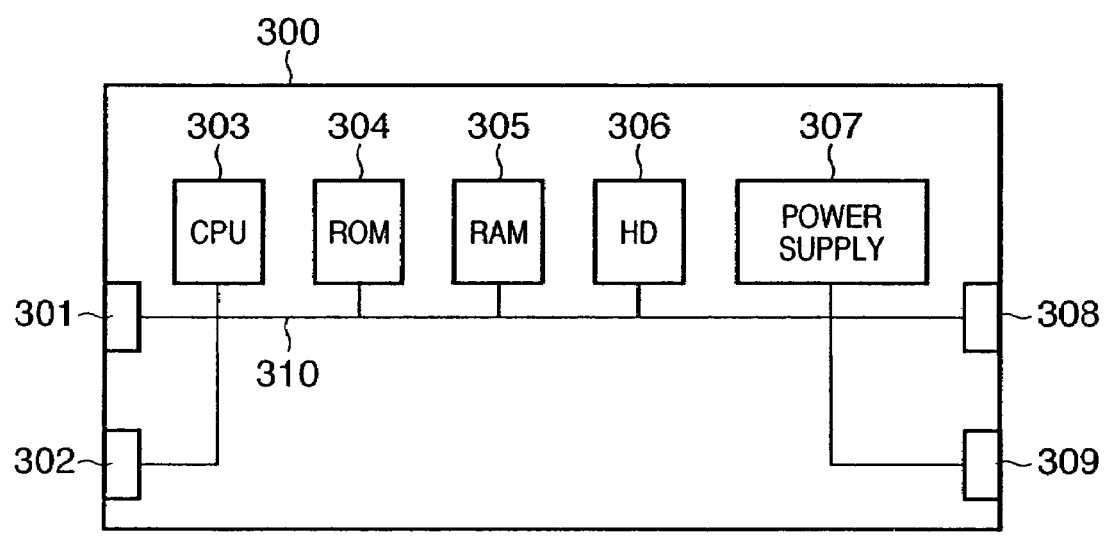
FIG. 3 is a view showing the structure of a node.

FIG. 3 shows a typical example of the internal structure of a node. A node is either a router or a host. A router transfers packets not addressed to it, but a host does not. As shown in FIG. 3, a node is a computer having, e.g., a CPU 303, ROM 304, RAM 305, HD (Hard Disk) 306, power supply 307, keyboard/pointing device interface 308, monitor interface 309, and network interfaces 301 and 302. While a router has a plurality of network interfaces, a host has one network interface in many cases. Some nodes have no HD.

The following process contents (procedures) are implemented as a device or program, and a node having this device executes the procedures, or a node having the ROM 304 or HD 306 in which the program is stored executes the procedures. For example, when the procedures are implemented as a program, the CPU 303 loads the program, and encrypts data of interest to compute a cipher text via a bus 310, while using the RAM 305 as a computation space as needed.

As will be described in detail below, the node shown in FIG. 3 is a data sharing apparatus which shares first data y_AB with a communication partner.

The protocol of this embodiment will be explained below with reference to FIG. 1. In the following explanation, the node A is the host 204, and the node B is a host 209. The node S is the host 206 or a host (not shown) capable of communication via the default gateway 202 or Internet 201.

Figure 1:
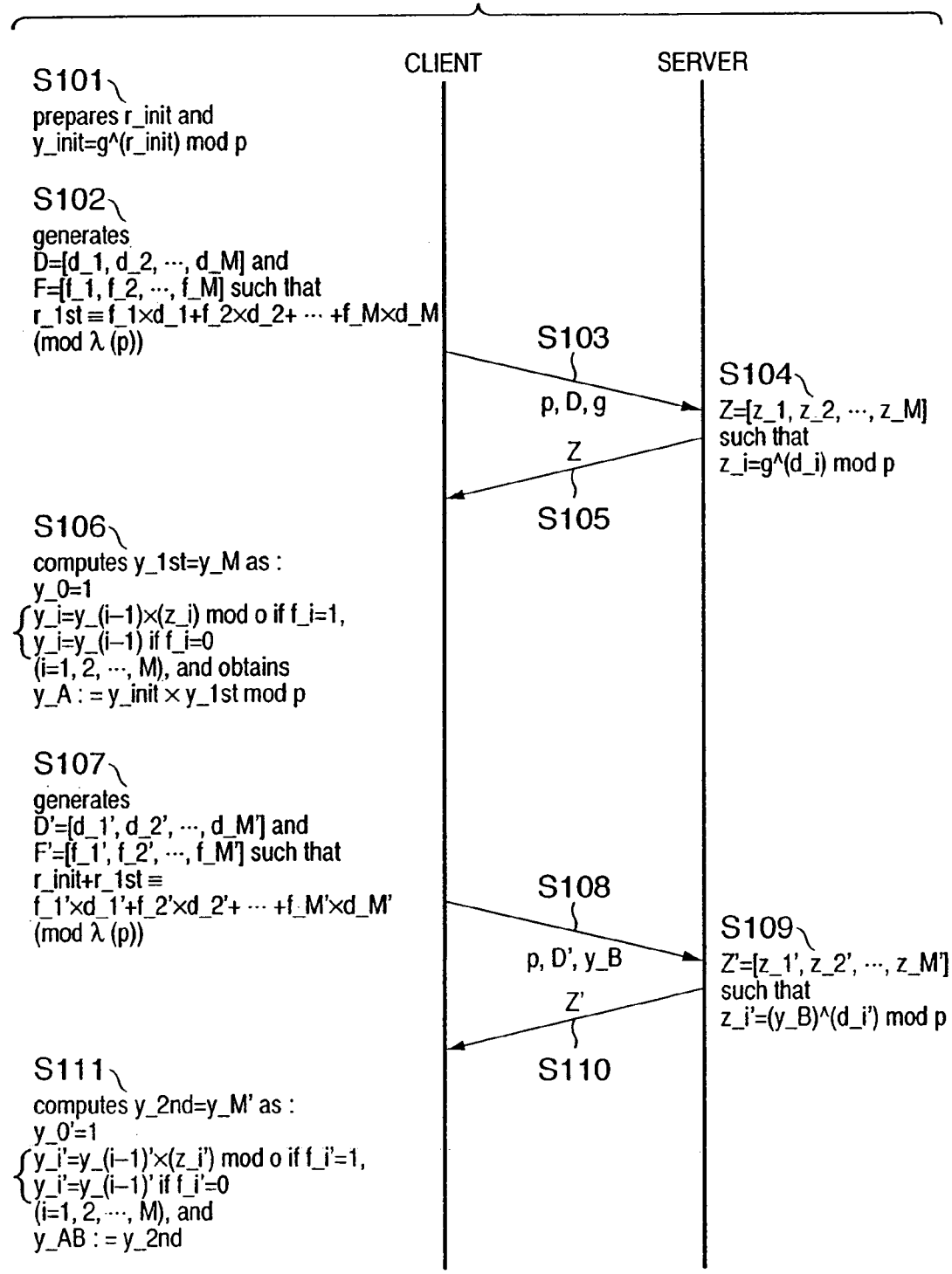
FIG. 1 is a view of a server-aided computation (SAC) protocol.

FIG. 1 shows a protocol (of two SAC) performed when the client and server execute DH. The client (the node A, e.g., the host 204 shown in FIG. 2) has secret information $x\_A$, and intends to obtain $y\_AB=(y\_B)^{\wedge}(x\_A) \bmod p$ to be finally shared with the communication partner (the node B, e.g., the host 209 shown in FIG. 2) which performs IPsec communication, and $y\_A=g^{\wedge}(x\_A) \bmod p$ which is necessary during the course of the processing in order to obtain y_AB, by using the SAC protocol. The x_A is a secret of the client, and g and p are open to the public. The Carmichael function of p is $\lambda(p)$. The client knows the IP address of the server (the node S, e.g., the host 206).

In step S101, the client (host 204) prepares random numbers r_init and $y\_init=g^{\wedge}(r\_init) \bmod p$. The r_init is an integer greater than or equal to 1 and less than p. If the protocol shown in FIG. 1 was executed in the past, r and g^r mod p calculated last are used as r_init and $y\_init=g^{\wedge}(r\_init) \bmod p$, respectively. If the protocol shown in FIG. 1 was executed in the past, r and g^r mod p calculated last are stored in the RAM 305 or HD 306.

Also, if this protocol is to be executed for the first time, the client is shipped such that $y\_init=g^{\wedge}(r\_init) \bmod p$ already calculated by generating the random number r_init during the manufacture is recorded in the ROM 304 or HD 306. Alternatively, in another embodiment, the random number r_init is generated to calculate $y\_init=g^{\wedge}(r\_init) \bmod p$ in a standby state (in which the SAC protocol is not executed), and the result of the calculation is recorded in the RAM 305 or HD 306. Furthermore, in still another embodiment, the client executes, together with the server, an unconditionally secure SAC protocol (to be described later), before SAC (a protocol to be explained with reference to FIG. 6) for IKE.

In step S102, the client randomly generates an integer vector $D=[d\_1, d\_2, \ldots, d\_M]$ and a binary vector $F=[f\_1, f\_2, \ldots, f\_M]$ such that $r\_1st=f\_1*d\_1+f\_2*d\_2+ \ldots +f\_M*d\_M \pmod{\lambda(p)}$. Note that M and L are some integers, d_i is greater than or equal to 1 and less than p, and the weight of F (the number of elements having a value of 1, of the elements $f\_1, f\_2, \ldots, f\_M$ of F) is less than L. The above equation indicates that the residue obtained by dividing d by $\lambda(n)$ equals the residue obtained by dividing the result of $f\_1*d\_1+f\_2*d\_2+ \ldots + f\_M*d\_M$ by $\lambda(n)$.

In step S103, the client sends p, D, and g to the server.

In step S104, the server computes $Z=[z\_1, z\_2, \ldots, z\_M]$ such that $z\_i=g^{\wedge}(d\_i) \bmod p$. In step S105, the server sends Z to the client.

In step S106, the client computes y_M as follows. That is, let $y\_0=1$, the client computes $y\_i=y\_(i-1)*(z\_i) \bmod p$ if $f\_i=1$, and computes $y\_i=y\_(i-1)$ if $f\_i=0$, for $i=1, 2, \ldots, M$. The client repeats this computation from i=1 to i=M. That is, the client sequentially obtains $y\_1, y\_2, \ldots$, and obtains y_M by repeating the computation. The y_M is used as y_1st.

The client then records r_1st and y_1st (=g^(r_1st) mod p) in the RAM 305, and obtains y_A by y_A=y_init*y_1st mod p. The r_1st and y_1st recorded in the RAM 305 are used as r_init and y_init, respectively, for the next time.

Since the client (the node A, e.g., the host 204 shown in FIG. 2) has executed IKE together with the node B (e.g., the host 209 shown in FIG. 2), it sends y_A to the node B and receives y_B from the node B (not shown). Note that although the node B computes y_B as explained in step S401B of FIG. 4, it may also obtain y_B following the same procedure as in steps S101 to S106 of FIG. 1.

In step S107, the client randomly generates an integer vector D'=[d_1', d_2', ..., d_M'] and a binary vector F'=[f_1', f_2', ..., f_M'] such that r_init+r_1st=f_1'*d_1'+f_2'*d_2'+ ... +f_M'*d_M' (mod λ(p)). Note that M' and L are some integers, d_i' is greater than or equal to 1 and less than p, and the weight of F' (the number of elements having a value of 1, of the elements f_1', f_2', ..., f_M' of F') is less than L.

In step S108, the client sends p, D', and y_B to the server.

In step S109, the server computes Z'=[z_1', z_2', ..., z_M'] such that z_i'=y_B^(d_i') mod p. In step S110, the server sends Z' to the client.

In step S111, the client computes y_M' as follows. That is, let y_0'=1, the client computes y_i'=y_(i-1)'*(z_i') mod p if f_i'=1, and computes y_i'=y_(i-1)' if f_i'=0, for i=1, 2, ..., M. The client repeats this computation from i=1 to i=M. That is, the client sequentially obtains y_1', y_2', ..., and obtains y_M' by repeating the computation. The y_M' is used as y_2nd. The y_2nd is used as y_AB (y_AB:=y_2nd).

It is now clear that DH is executed once by executing the SAC protocol twice. To execute DH next, r_1st and y_1st=g^(r_1st) mod p calculated from the random numbers r_init and y_init=g^(r_init) mod p and stored in the RAM 305 are used.

As described above, FIG. 1 shows the program by which the CPU 303 executes the data sharing method of sharing the first data y_AB with the communication partner (node B).

That is, in FIG. 1 as explained above, the second data y_1st is obtained from the third data r_1st by using SAC, and the communication partner generates the fourth data y_A for obtaining the first data y_AB from the second data y_1st and fifth data y_init (steps S102 and S106). Also, the first data y_AB to be shared with the communication partner is obtained by using SAC from the sixth data (r_init+r_1st) generated from the third data r_1st and seventh data r_init (steps S107 and S111).

More specifically, in the SAC (steps S106 and S107) for obtaining the second data y_1st from the third data r_1st, the ninth data Z is obtained from the eighth data D which is obtained from the third data r_1st by the first conversion (decomposition using the data F), and the second data y_1st is generated from the ninth data Z by using the second conversion (synthesis using the data F) corresponding to the first conversion. Also, in the SAC (steps S107 and S111) for obtaining the first data y_AB from the sixth data (r_init+r_1st), the 11th data Z' is obtained from the 10th data D' which is obtained from the sixth data (r_init+r_1st) by the third conversion (decomposition using the data F'), and the first data y_AB is generated from the 11th data Z' by using the fourth conversion (synthesis using the data F') corresponding to the third conversion.

The second data y_1st is the residue obtained by dividing $g^{r\_1st}$ (g to the "third data r_1st"th) by p. The first data y_AB is the residue obtained by dividing the 12th data $y\_B^{(r\_init+r\_1st)}$ (y_AB to the "sixth data (r_init+r_1st)"th) by p. The fourth data y_A is the residue obtained by dividing the product of the second data y_1st and fifth data y_init by p. The sixth data (r_init+r_1st) is the sum of the third data r_1st and seventh data r_init (step S107). The fifth data y_init is the residue obtained by dividing $g^{r\_init}$ (g to the "seventh data r_init"th) by p.

In this embodiment, the second data y_1st and third data r_1st for obtaining the firs shared data y_AB are used as the fifth data y_init and seventh data r_init, respectively, for obtaining the second shared data.

Additionally, on the basis of the first data y_AB, an encryption key used in communication with the communication partner is generated.

Referring to FIG. 3, the CPU 303 operates as a SAC means for generating the third data r_1st, and obtaining the second data y_1st from the third data r_1st by SAC by using the network interface 301.

The CPU 303 also operates as a generating means for generating the fourth data y_A, by which the communication partner obtains the first data y_AB, from the second data y_1st obtained by the SAC and the fifth data y_init stored in the RAM 305.

By using the third data r_1st generated beforehand and the seventh data r_init stored in the RAM 305, the CPU 303 which operates as the SAC means obtains, by using SAC, the first data y_AB to be shared with the communication partner from the sixth data (r_init+r_1st) generated from the third data r_1st and seventh data r_init.

In the two SAC protocols described above, the vectors D and F in the first SAC protocol and the vectors D' and F' in the second SAC protocol are independent. That is, the first SAC protocol is SAC using r_1st as secret information, but the second SAC protocol is SAC using r_init+r_1st (mod λ(p)) as secret information. This expression indicates the calculated value of r_init+r_1st, or the residue obtained by dividing the calculated value of r_init+r_1st by λ(p). The secrets r_init and y_init=g^(r_init) mod p of the client are random numbers unknown to anyone else except the client. Therefore, any third party observes these two SAC protocols as independent different SAC protocols.

Also, even if any third party tries to obtain r_1st (i.e., F) by exhaustive search from y_A and D, r_1st cannot be uniquely determined because the random number r_init exists. This disables the attack mentioned as the problem, i.e., the attack which breaks DH by obtaining the result (y_AB) of the second SAC protocol by using D and F which is found by attacking the first SAC protocol.

The second SAC protocol is SAC of modular exponentiation using r_init+r_1st (mod λ(p)) as an exponent. The r_init is a secret value, and the information y_init for uniquely specifying r_init is secret. Therefore, r_init cannot be specified from the second SAC protocol.

The execution of the second DH will be described below. Symbols formed by adding '~{n}' to variables indicate variables when the nth DH is executed.

y_init~{2}=g^(r_init~{2}) mod p to be used in the second DH is calculated by the server when the first DH is executed (y_1st~{1}=g^(r_1st~{1}) mod p), so the client need not calculate it.

The resistance which the first SAC protocol has against an exhaustive search attack when the second DH is executed will be described below. Unlike in the execution of the first DH, r_init~{2} and y_init~{2}=g^(r_init~{2}) mod p to be used in the execution of the second DH are values calculated when the first DH is executed. That is, r_init~{2}=r_1st~{1} and y_init~{2}=y_1st~{1}(=g^(r_1st~{1}) mod p) are values obtained by combining elements of D~{1} and Z~{1} when the first DH is executed.

The result (y_init~{2}*y_1st~{2} mod p) obtained by modular multiplication of y_init~{2}=y_1st~{1}(=g^(r_1st~{1}) mod p) and the value y_1st~{2} obtained by combining elements of D~{2} and Z~{2} and used when the second DH is executed is transmitted as y_A~{2} to the communication partner across the Internet. Therefore, any attacker is presumably capable of acquiring y_A~{2}.

On the other hand, the value of y_1st~{2} is locally calculated by the client, but is not communicated on the Internet, so any attacker cannot acquire this value.

Accordingly, to obtain the exponent value r_init~{2}+r_1st~{2} mod λ(p) of y_A~{2} by exhaustive search attack, it is necessary to simultaneously succeed in an attack of obtaining the exponent value of y_init~{2}=y_1st~{1}(=g^(r_1st~{1}) mod p) by exhaustive search, and an attack of obtaining the exponent value of y_1st~{2}(=g^(r_1st~{2}) mod p) by exhaustive search. That is, the resistance which the first SAC protocol has against exhaustive search attack when the second DH is executed is the product of the resistance which the first SAC protocol has against exhaustive search attack when the first DH is executed and the resistance which the first SAC protocol has against exhaustive search attack when the second DH is executed.

This makes it necessary to break the SAC protocol of modular exponentiation twice by exhaustive search attack as described above. If the process of breaking the protocol once requires exhaustive search of 10^20 combinations, exhaustive search of 10^20*10^20=10^40 combinations is necessary. This increases the resistance against exhaustive search attack as described above.

A similar relationship holds between the execution of the kth DH and the execution of the (k+1)th DH. Therefore, if the process of obtaining the exponent of the first SAC when DH is executed requires exhaustive search of 10^20 combinations, the process of obtaining the exponent r_1st~{k+1} of the first SAC when the (k+1)th DH is executed during the execution of two arbitrary consecutive DH's (the execution of the kth DH and the execution of the (k+1)th DH) requires exhaustive search of 10^20×10^20=10^40 combinations.

On the other hand, during the execution of the first and third DH's, no common variables are used in y_init~{1}=g^(r_init~{1}) mod p, y_1st~{1}=g^(r_1st~{1}) mod p, y_init~{3}=y_1st~{2}=g^(r_1st~{2}) mod p, and y_1st~{3}=g^(r_1st~{3}) mod p. Hence, the execution of the first DH and the execution of the third DH are independent of each other. Therefore, if y_init~{3}=y_init~{1}*y_1st~{2} mod p is used as y_init~{3} when the third DH is executed, y_init~{1} (i.e., r_init~{1}) is unknown to any attacker. This makes it impossible to uniquely obtain r_1st~{3} from y_A~{3}=y_init~{3}*y_1st~{3}=y_init~{1}*y_1st~{2}*y_1st~{3}=g^(r_init~{1})*g^(r_1st~{2})*g^(r_1st~{3})(mod p) when the third DH is executed.

Assume that the same processing is repeated on and after the fourth DH. That is, assume that y_init~{4}=y_init~{1}*y_1st~{3} mod p is used as y_init~{4} when the fourth DH is executed, y_init~{5}=y_init~{1}*y_1st~{4} mod p is used as y_init~{5} when the fifth DH is executed, . . . , y_init~{k}=y_init~{1}*y_1st~{k-1} mod p is used as y_init~{k} when the kth DH is executed.

When the kth DH is executed (k is greater than or equal to 4), y_init~{k}=y_init~{1}*y_1st~{k-1}=g^(r_init~{1})*g^{r_1st~{k-1}}(mod p), and y_init~{1} and r_init~{1} are unknown to any attacker. Therefore, it is impossible to uniquely specify the value of y_1st~{k-1}=g^(r_1st~{k-1}) mod p from D~{k} and Z~{k}, so the value of r_1st~{k-1} cannot be obtained by exhaustive search attack. This disables, when the nth DH is executed (n is greater than or equal to 3), the attack mentioned as the problem, i.e., the attack of breaking DH by obtaining the result (y_AB~{n}) of the second SAC protocol by using D~{n} and F~{n} which is found by attacking the first SAC protocol.

In short, if y_init~{n}=y_init~{1}*y_1st~{n-1} mod p, the attack mentioned as the problem cannot hold after the nth DH is executed (n is greater than or equal to 3).

From the foregoing, only when the second DH is executed, this DH may be broken by exhaustive search of 10^40 possibilities. To nullify (disable) this attack, it is only necessary to form r_init2 and y_init2=g^(r_init2) mod p which the client alone knows, and perform computation by using y_init~{2}=y_init2*y_1st~{1} mod p. That is, the two random numbers r_init and r_init2 and their exponential calculated values y_init=g^(r_init) mod p and y_init2=g^(r_init2) mod p are initially prepared, and computation is performed using y_init~{2}=y_init2*y_1st~{1} mod p, and y_init~{n}=y_init~{1}*y_1st~{n-1} mod p (n=3, 4, . . . ) This disables the attack mentioned as a problem.

[Unconditionally Secure SAC Protocol]

A SAC protocol for obtaining y_init (=g^(r_init) mod p) used in the protocol shown in FIG. 1 will be described below.

This SAC protocol has the characteristic feature that SAC server or third party cannot specify secret information x of a client in an information theoretic sense. Assume that a binary representation of the secret information x (a K-bit integer) is x_(K-1)|x_(K-2)| . . . |x_2|x_1|x_0 ('|' is a symbol for explicitly separating each bit, and each bit is x_i. The value of x_i is 0 or 1.)

(1) The client sends the modulus p, generator g, and K to the server.
(2) The server computes z_i=g^(b_i) mod p where b_i=2^i (i=0, 1, . . . , K-1), and sends Z=[z_0, z_1, z_2, . . . , z_(K-1)] to the client.
(3) The client computes g^x mod p=y_K as follows. That is, let y_0=1, the client computes y_(i+1)=y_i mod p if x_i=0, and computes y_(i+1)=y_i*z_i mod p if x_i=1, for i=0, 1, . . . , K-1. The client repeats this computation from i=1 to i=K-1. That is, the client sequentially obtains y_1, y_2, . . . , and obtains y_K by repeating the computation.

In the protocol shown in FIG. 1, the secret information x is used as r_init, and y_K is used as y_init (=g^(r_init) mod p).

[End of Unconditionally Secure SAC Protocol]

In the above embodiment, as a mathematical setting, a multiplicative group in which the discrete logarithm problem is infeasible and modular exponentiation using a random number of this multiplicative group as an exponent are explained. However, it is also possible to use an elliptic curve in which the discrete logarithm problem is infeasible and multiplication of a point on this elliptic curve by a random number (integer).

In the above setting using a multiplicative group, an integer x is used as a secret key, a prime p and a generator g of GF(p) are used as parameters, and y=g^{x} mod p is used as a public key. In the setting using an elliptic curve, an integer x is used as a secret key, an elliptic curve and a point P on the curve are used as parameters, and y=x*P is used as a public key.

Figure 4:
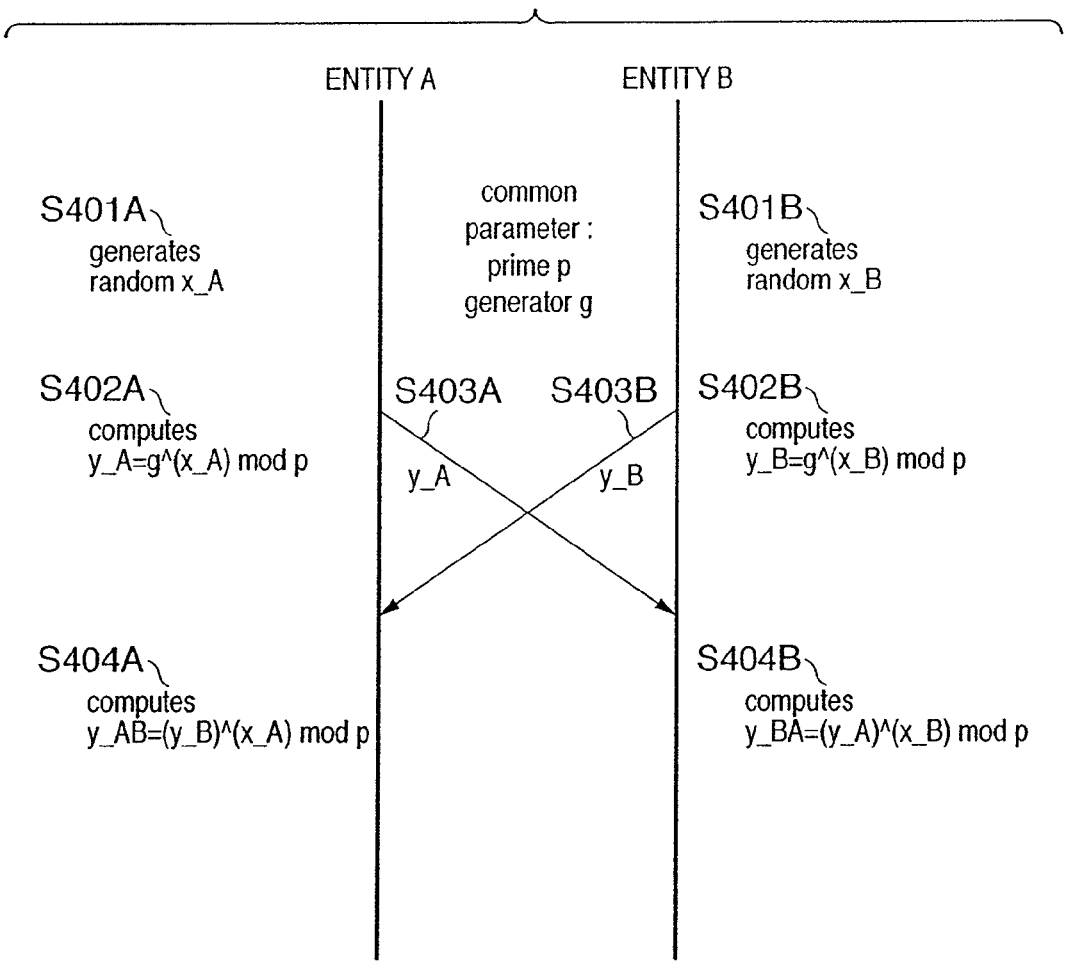
FIG. 4 is a view of the Diffie-Hellman public-key distribution scheme.
Figure 5:
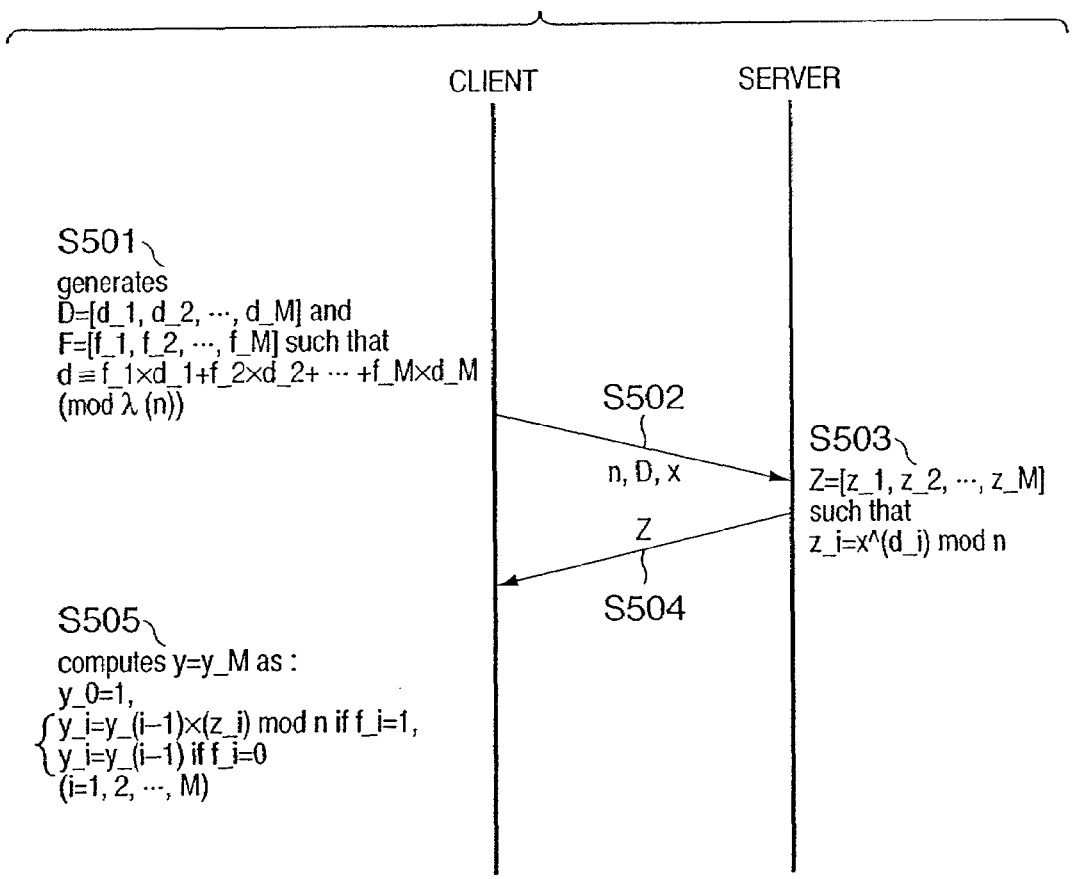
FIG. 5 is a view of a protocol RSA-S1.

A protocol shown in FIG. 4 is as follows. An entity A generates a secret key x_A, computes y_A=x_A*P, and sends y_A to an entity B. The entity B generates a secret key x_B, computes y_B=x_B*P, and sends y_B to the entity A. The entity A receives y_B, and computes y_AB=x_A*y_B. The entity B receives y_A, and computes y_BA=x_B*y_A.

In this setting using an elliptic curve, an element (integer) of a multiplicative group corresponds to a point (having x- and y-coordinates) on an elliptic curve, and multiplication of elements of a multiplicative group corresponds to addition of points on an elliptic curve. Exponentiation (i.e., raising to the kth power) in a multiplicative group is equivalent to adding a point multiple times (i.e., k times) on an elliptic curve, and hence corresponds to multiplication of a point by an integer (i.e., k).

Accordingly, the exponent (integer) r_init+r__1st (in step S107 of FIG. 1) used in modular exponentiation in the multiplicative group setting is still (integer) r_init+r__1st in the elliptic curve setting, and y_A=y_init*y__1st mod p (in step S106 of FIG. 1) in the multiplicative group setting is y_A=y_init+y__1st on the elliptic curve in the elliptic curve setting. Note that addition (an operation indicated by +) of points on an elliptic curve and multiplication (an operation indicated by *) of a point on an elliptic curve by an integer are mathematically defined precisely. The precise definitions can be found in mathematical text books such as "A Course in Number Theory and Cryptography, 2nd edition" by Neal Koblitz, Springer-Verlag (1994).

In the protocol shown in FIG. 1, the second data y__1st is obtained by multiplication of the point P on the elliptic curve by the third data r__1st (integer), and the fourth data y_A is obtained by addition of the second data y__1st (point) on the elliptic curve and the fifth data y_init (point) on the elliptic curve. Also, the first data y_AB is obtained by multiplication of the 12th data y_B (point) on the elliptic curve by the sixth data (r__1st+r_init) (integer), and the sixth data (r_init+r__1st) is obtained by addition of the third data r__1st (integer) and seventh data r_init (integer). The fifth data y_init is obtained by multiplication of the point P on the elliptic curve by the seventh data r_init (integer).

In step S103 of FIG. 1, the client sends parameters (including P) which define the elliptic curve and D to the server. In step S108, the client sends D' and y_B to the server.

In the following embodiment, instead of a multiplicative group in which the discrete logarithm problem is infeasible and modular exponentiation which uses a random number of this multiplicative group as an exponent, it is possible to use an elliptic curve in which the discrete logarithm problem is infeasible and multiplication of a point on the elliptic curve by a random number.

The server of the SAC protocol is formed on a LAN as a single node, e.g., the host 206 shown in FIG. 2, and another IPv6 apparatus (the host 204) on the LAN can request this SAC server to compute DH. Alternatively, a PC having high computation capability, e.g., the host 205 shown in FIG. 2 can be installed on a LAN in an office or home to operate as a SAC server. In this case, another IPv6 apparatus on the LAN, e.g., a digital camera (the host 204) having low computation capability can perform IPsec communication with still another IPv6 apparatus (the host 209) on the Internet 201 by IKE by requesting the server (host 204) to perform computation.

The present invention is explained on the basis of the preferred embodiment. However, the present invention is not limited to the above embodiment, and can be variously modified within the scope of claims. For example, the server of the SAC protocol may also be installed on the Internet 201.

A case in which a protocol is formed by integrating the above-mentioned SAC protocol (FIG. 1) with IKE, and a node which performs IKE also functions as a server of the SAC protocol will be described below.

For example, this is a case in which a server of a Web site on the Internet also operates as a SAC server, and, when another IPv6 apparatus on the Internet, e.g., a portable terminal having low computation capability accesses the Web site and performs IPsec communication by IKE, the other IPv6 apparatus executes IKE together with the server and at the same time requests the server to perform computation.

In this embodiment, in the form shown in FIG. 1, a communication partner is requested to perform the SAC for obtaining the second data y__1st from the third data r__1st, and the SAC for obtaining the first data y_AB from the sixth data (r_init+r__1st).

First, IKE will be briefly described below. Details of IKE is described in RFC2409, "The Internet Key Exchange (IKE)".

IKE consists of phase 1 and phase 2. ISAKMP SA is established in phase 1, and IPsec SA is established in phase 2. In phase 1, a main mode (six times of data transmission/reception) or an aggressive mode (three times of data transmission/reception) is executed in combination with four authentication methods. Accordingly, eight combinations exist in phase 1 alone. Data to be transmitted/received changes from one combination to another in each mode. Of the four authentication methods, DH data is encrypted in two methods using encryption of a public-key cryptography. On the other hand, phase 2 has only a quick mode, and DH is an option. The substances of IKE are mutual agreement of SA and execution of DH. Therefore, if data transmission/reception related to these factors is not encrypted, the SAC protocol (FIG. 1) described above is directly applicable.

Figure 10:
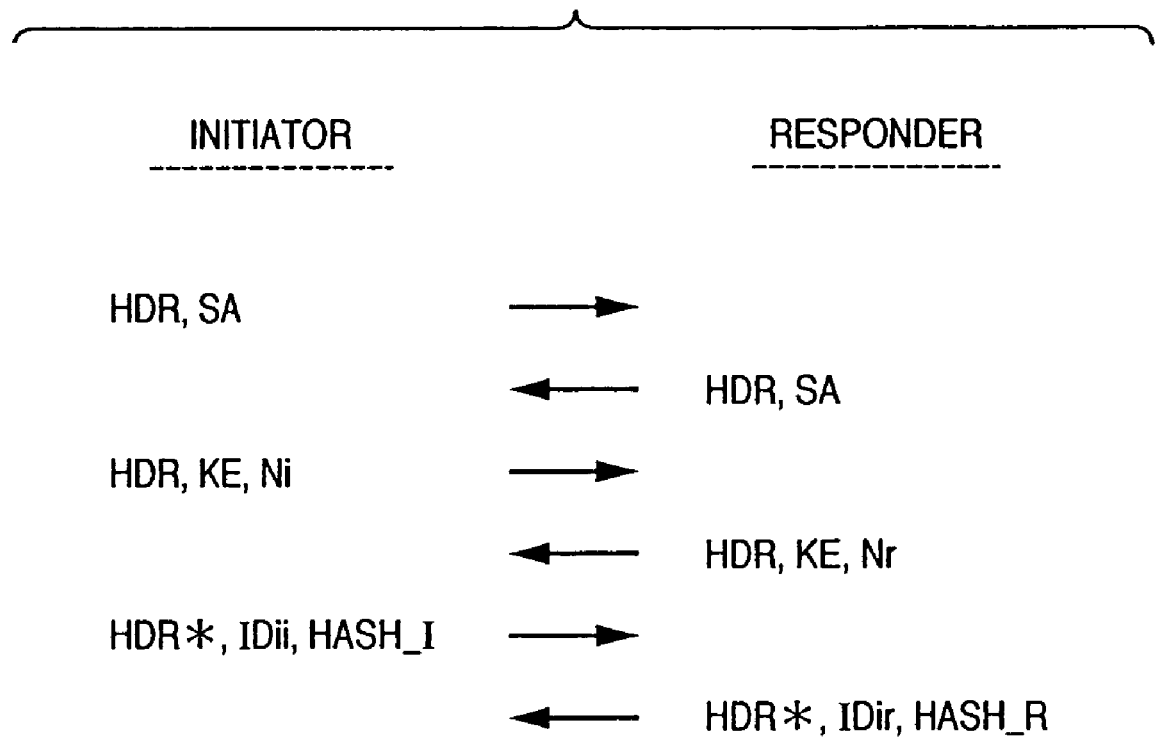
FIG. 10 is a view of a protocol in a main mode which adopts an authentication method using a pre-shared key.

According to RFC2409, the main mode which adopts an authentication method using a pre-shared key is a protocol as shown in FIG. 10 (details of data will be explained later).

HDR in FIG. 10 indicates an ISAKMP header, and data described to the right of this header represents a payload. For example, "HDR, SA" indicates that the payload of an ISAKMP packet is SA. HDR* indicates that the payload of the packet is encrypted. KE is information exchanged by Diffie-Hellman, Ni and Nr are Nonce (random numbers), IDii and IDir are identification payloads, and HASH_I and HASH_R are hash values generated from data exchanged to that point. The last two encrypted data are encrypted by using an encryption key generated on the basis of secret information shared by Diffie-Hellman.

Figure 11:
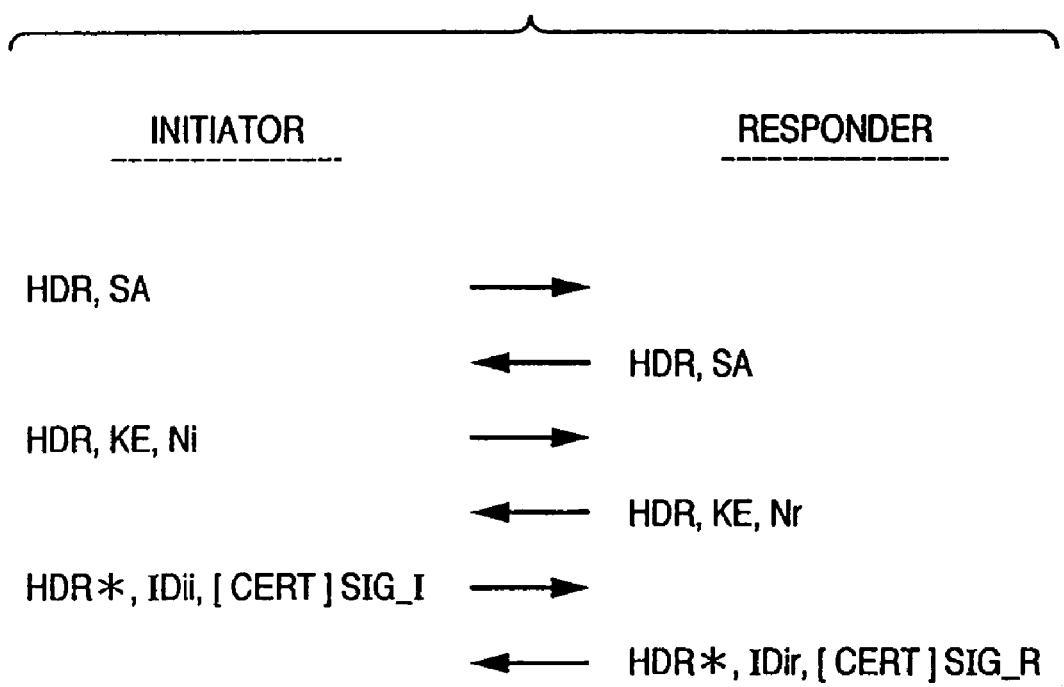
FIG. 11 is a view of a protocol in a main mode which adopts an authentication method using a digital signature.

The main mode which adopts an authentication method using a digital signature is a protocol as shown in FIG. 11.

SIG_I and SIG_R are the results of application of digital signatures to HASH_I and HASH_R, respectively. That is, these two protocols described above are substantially the same, as can be seen by comparing them.

Figure 6:
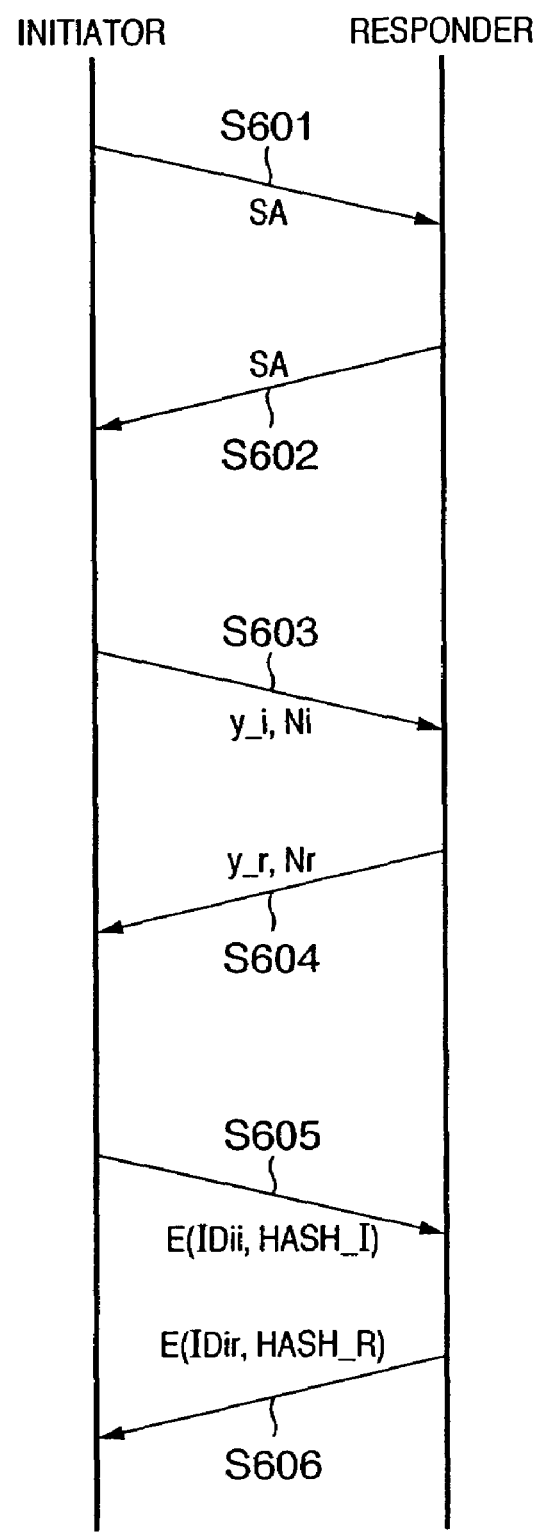
FIG. 6 is a view of an abstracting IKE protocol (main mode)

Accordingly, by taking as an example the main mode which must be supported when IKE is used, a protocol (to be referred to as an abstracting IKE protocol (main mode) hereinafter) which extracts the substances of an authentication method using a pre-shared key and an authentication method using a digital signature in the main mode will be described below with reference to FIG. 6.

[Abstracting IKE Protocol (Main Mode)]

In step S601, an initiator of IKE sends SA proposals (one or more security associations) to a responder.

In step S602, the responder selects a security association to be used from the proposals, and sends it to the initiator (when a security association is determined, p and g are determined).

In step S603, the initiator sends $y\_i (=g\hat{}(x\_i) \bmod p)$ and Nonce Ni to the responder ($x\_i$ is secret information of the initiator).

In step S604, the responder sends $y\_r (=g\hat{}(x\_r) \bmod p)$ and Nonce Ni to the initiator ($x\_r$ is secret information of the responder).

In step S605, the initiator computes $(g\hat{}(x\_r))\hat{}(x\_i) \bmod p$ from $y\_r=g\hat{}(x\_r) \bmod p$ received from the responder and its own secret information $x\_i$, generates an encryption key on the basis of the result, and sends, to the responder, data obtained by encrypting identification payloads IDii and HASH_I by using the key (the encryption key and HASH_I are generated in accordance with the method described in RFC2409).

In step S606, the responder computes $(g\hat{}(x\_i))\hat{}(x\_r) \bmod p$ from $y\_i=g\hat{}(x\_i) \bmod p$ received from the initiator and its own secret information $x\_r$, generates an encryption key on the basis of the result, and sends, to the initiator, data obtained by encrypting identification payloads IDir and HASH_R by using the key (the encryption key and HASH_R are generated in accordance with the method described in RFC2409).

Figure 7:
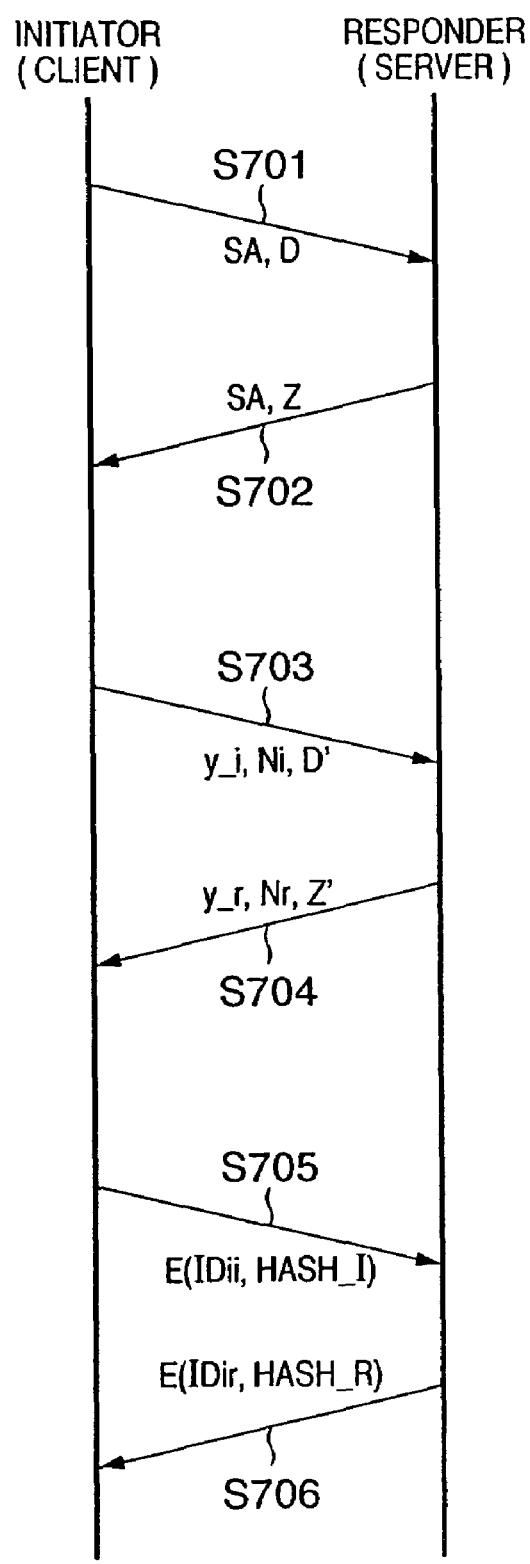
FIG. 7 is a view of an integrated IKE protocol (when a responder also serves as a server-aided computation (SAC) server)

A case in which the SAC protocol shown in FIG. 1 is applied to the above abstracting IKE protocol (main mode), and a node (responder) for performing IKE also functions as a server of the SAC protocol will be explained below with reference to FIG. 7. FIG. 7 is a protocol obtained by integrating the SAC protocol shown in FIG. 1 with the abstracting IKE protocol (main mode) shown in FIG. 6. A responder processes a request for computation for obtaining y_ir (the first data) which an initiator (communication apparatus) shares with the responder (communication partner). This processing is executed on the basis of a program stored in the ROM 304 or HD 306. Referring to FIG. 7, both IKE data and SAC data are included in one data transfer. However, the same effect can also be obtained by simultaneously executing the two protocols in parallel, so the two data need not be included in one data transfer. Note that each of the initiator and responder has the structure shown in FIG. 3. The network interface 301 (an interface which connects the link 207) of the responder is a receiving means for receiving a request from the initiator (communication apparatus), and a transmitting means for transmitting the result of computation to the initiator (communication apparatus). The CPU 303 of the responder is a computing means for performing SAC.

The initiator knows that the responder is a SAC server and the partner of IPsec communication performed by IKE, and has the address and the settings, as a SAC server, of the responder.

In step S701, as in steps S101 and S102 of FIG. 1, the initiator determines a random number $r (=r\_1st)$ and parameters D and F of SAC, and sends SA proposals and D to the responder. The responder receives D (the first request) for obtaining y__1st (the second data) from r__1st (the third data).

In step S702, the responder selects a security association to be used from the proposals. Since p and g are determined, the responder computes $Z (z\_i=g\hat{}(d\_i) \bmod p)$ from p, g, and D, and sends the selected security association and Z to the initiator. That is, in accordance with D (the first request), the responder performs the first computation to obtain Z (the first computation result), and sends Z (the first computation result) to the initiator.

In step S703, as in step S106 of FIG. 1, the initiator obtains y__1st from (F and) Z, and also computes y_i. This y_i is the same as $y\_A (=y\_init*y\_1st \bmod p)$ in step S106 of FIG. 1. Similar to FIG. 1, y_init is prepared beforehand. Also, as in step S107 of FIG. 1, the initiator determines parameters D' and F' of SAC from r_init+r. Similar to FIG. 1, r_init is prepared beforehand. Then, the initiator sends y_i, Nonce Ni, and D' to the responder. The responder receives the request D' (the second request) for obtaining y_ir (the first data) from r_init+r__1st (the sixth data) generated from r__1st (the third data) and r_init (the seventh data).

In step S704, the responder determines y_r. This y_r can be calculated in the same manner as y_A and y_B shown in FIG. 4. Also, the responder computes $Z' (z\_i'=(y\_r)\hat{}(d\_i')) \bmod p)$ from y_r and D'. The responder sends y_r, Nonce Nr, and Z' to the initiator. That is, in accordance with D' (the second request), the responder performs the second computation by using y_r (the 12th data) to obtain Z' (the second computation result), and sends Z' (the second computation result) to the initiator.

In step S705, the initiator obtains y_ir from (F' and) Z'. This y_ir can be obtained in the same manner as y_AB in step S111 of FIG. 1. Also, the initiator generates an encryption key on the basis of y_ir, and obtains HASH_I (the encryption key and HASH_I are generated in accordance with the method described in RFC2409). The initiator sends encrypted data of identification payloads IDii and HASH_I to the responder.

In step S706, the responder obtains y_ri. This y_ri can be obtained in the same manner as in steps S404A and S404B of FIG. 4. The responder generates an encryption key on the basis of y_ri, and obtains HASH_R. The responder sends encrypted data of identification payloads IDir and HASH_R to the initiator.

When an IPv6 apparatus having low computation capability and an IPv6 apparatus having high computation capability perform IKE, the above protocol allows secure execution of IKE while distributing the load.

Note that D' which the initiator sends to the responder in step S703 may also be sent in step S701.

In this embodiment, a case in which a protocol is formed by integrating the SAC protocol shown in FIG. 1 with IKE, and a server of the SAC protocol is running on, e.g., a gateway of a home LAN will be described below.

For example, this is a case in which a user performs IPsec communication by IKE when accessing an internal IPv6 terminal of a home LAN across the Internet by using a PC or portable terminal from an Internet cafe at the destination or by using a PC in the office. In this case, the internal IPv6 terminal of the home LAN operates as a responder. However, the gateway (the gateway 202 shown in FIG. 2) is positioned between the initiator (e.g., the host 209 shown in FIG. 2) and the responder (e.g., the host 204 shown in FIG. 2), and relays IKE packets. This makes it possible to provide a SAC service while combining the IKE protocol and SAC protocol. The network interface 301 (an interface which connects the link 207) of the gateway is a receiving means for receiving a request from the responder (communication apparatus), and a transmitting means for transmitting the result of computation to the responder (communication apparatus). Also, the CPU 303 of the gateway is a computing means for performing SAC.

This embodiment is an example in which, in the form shown in FIG. 1, a server located between a communication apparatus and a communication partner is requested to perform the SAC for obtaining the second data y__1st from the third data r__1st, and the SAC for obtaining the first data y_AB from the sixth data (r_init+r__1st).

Figure 8:
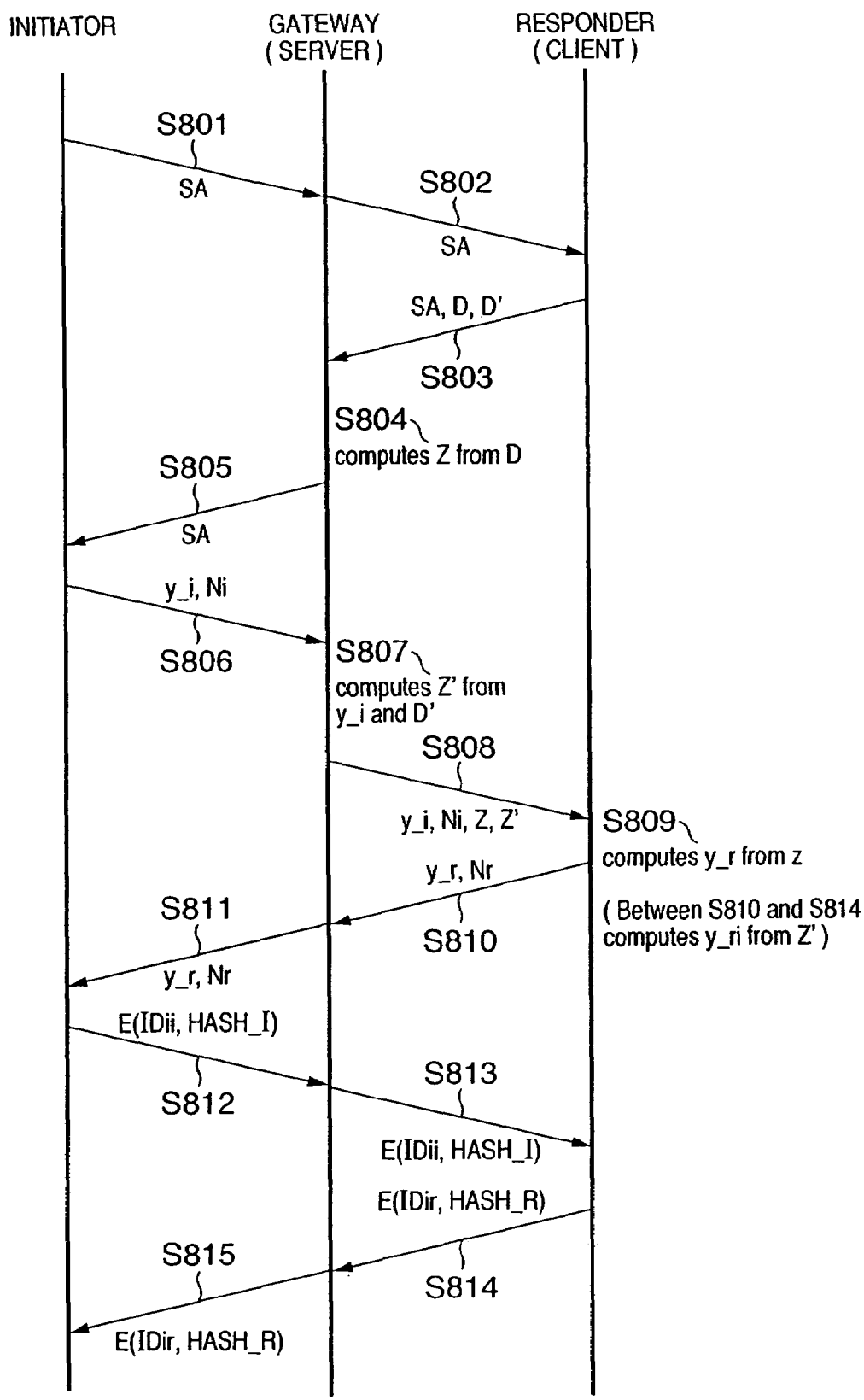
FIG. 8 is a view of an integrated IKE protocol (when a gateway also serves as a server-aided computation server)

The embodiment will be explained with reference to FIG. 8. The gateway (server) 202 processes a request for computation for obtaining y_ri (the first data) which the responder (communication apparatus) shares with the initiator (communication partner). This processing is executed on the basis a program stored in the ROM 304 or HD 306. Referring to FIG. 8, both the IKE data and SAC data are included in one data transfer. However, the same effect can also be obtained by simultaneously executing the two protocols in synchronism with each other, so the two data need not be included in one data transfer.

The responder (e.g., the host 204 shown in FIG. 2) sets the gateway (server) 202 as a default gateway & SAC server. The initiator (e.g., the host 209 shown in FIG. 2) knows the address of the responder.

In step S801, the initiator sends SA proposals (one or more security associations) to the responder.

In step S802, the gateway relays the SA proposals (one or more security associations) from the initiator to the responder.

In step S803, the responder determines r__1st, obtains (r_init+r__1st), determines parameters D and F of the SAC, and determines parameters D' and F' of the SAC from (r_init+r__1st). Similar to FIG. 1, r_init is prepared beforehand. The responder selects one security association from the proposals, sends it to the initiator via the gateway, and also sends it to the gateway together with D and D'.

In step S804, the gateway computes Z ($z\_r=g^{\wedge}(d\_r)$ mod p) from the selected security association (p and g are determined) and D. That is, the gateway receives D (the first request) by which the responder (communication apparatus) obtains y__1st (the second data) from r__1st (the third data), and D' (the second request) by which the responder (communication apparatus) obtains y_ri (the first data) from r_init+r__1st (the sixth data) generated from r__1st (the third data) and r_init (the seventh data), and performs the first computation to obtain Z (the first computation result) in response to D (the first request).

In step S805, the gateway relays the selected security association to the initiator. Note that steps S804 and S805 need not always be executed in this order.

In step S806, the initiator sends y_i ($=g^{\wedge}(x\_i)$ mod p) and Nonce Ni to the responder via the gateway (x_i is secret information of the initiator).

In step S807, the gateway computes Z' ($(z\_r)'=(y\_i)^{\wedge}(d\_r')$ mod p) from y_i and D' which the gateway receives from the initiator (to relay them to the responder). That is, the gateway receives y_i (the 12th data) from the initiator (communication partner), and, in response to D' (the second request), performs the second computation by using y_i (the 12th data) to obtain Z' (the second computation result).

In step S808, the gateway relays y_i and Ni to the responder, and sends Z and Z' (the first and second computation results) to the responder.

In step S809, as in step S106 of FIG. 1, the responder obtains y__1st from (F and) Z, and also computes y_r. This y_r is the same as y_A ($=y\_init*y\_1st$ mod p) in step S106 of FIG. 1. Note that y_init is prepared beforehand as in FIG. 1.

In step S810, the responder sends y_r and Nonce Nr to the initiator.

Between steps S810 and S814, the responder computes y_ri from (F' and) Z', generates an encryption key on the basis of y_ri, and obtains HASH_R. This y_ri can be obtained in the same manner as y_AB in step S111 of FIG. 1.

In step S811, the gateway relays y_r and Nonce Nr to the initiator.

In step S812, the initiator obtains y_ir ($=(y\_r)^{\wedge}(x\_i)$ mod p) from y_r received from the responder and its own secret information x_i, generates an encryption key on the basis of y_ir, obtains HASH_I, and sends encrypted data of identification payload IDii and HASH_I to the responder.

In step S813, the gateway relays the encrypted data of identification payloads IDii and HASH_I to the responder.

In step S814, the responder sends encrypted data of identification payloads IDir and HASH_R to the initiator. In this encryption, a key generated on the basis of y_ri is used.

In step S815, the gateway relays the encrypted data of identification payloads IDir and HASH_R to the initiator.

The above protocol allows an IPv6 apparatus having low computation capability to securely execute IKE by using the gateway as a SAC server.

In this embodiment, a case in which a protocol is formed by combining the SAC protocol of the first embodiment with IKE, a server of the SAC protocol is installed on the Internet as a node which exclusively provides SAC services, and this node operates like a proxy will be explained.

For example, this is a case in which when two IPv6 apparatuses on the Internet perform IPsec communication by IKE, both of these two apparatuses perform IKE by requesting the SAC server to perform computation, and IKE packets are always transmitted via the SAC server. In this case, the SAC server can be regarded as operating as a so-called IKE proxy.

This embodiment is an example in which, in the form shown in FIG. 1, a server located between a communication apparatus and a communication partner is requested to perform the SAC for obtaining the second data y__1st from the third data r__1st, and the SAC for obtaining the first data y_AB from the sixth data (r_init+r__1st).

Note that this embodiment may also be regarded as a protocol formed by combining the protocols shown in FIGS. 7 and 8. That is, a SAC server is present between an initiator and responder, and SAC services are provided to both the initiator and responder while IKE packets are relayed. This embodiment will be described below with reference to FIG. 9. The IKE proxy processes a request for computation for obtaining y_ir (the first data) which the initiator (communication apparatus) shares with the responder (communication partner). The IKE proxy also processes a request for computation for obtaining y_ri which the responder shares with the initiator. This processing is executed on the basis of a program stored in the ROM 304 or HD 306.

Each of the initiator, responder, and IKE proxy has the structure shown in FIG. 3. The network interfaces 301 and 302 of the IKE proxy are receiving means for receiving requests from the initiator (communication apparatus) and responder, and transmitting means for transmitting the results of computation to the initiator (communication apparatus) and responder. The CPU 303 of the IKE proxy is a computing means for performing SAC.

Figure 9:
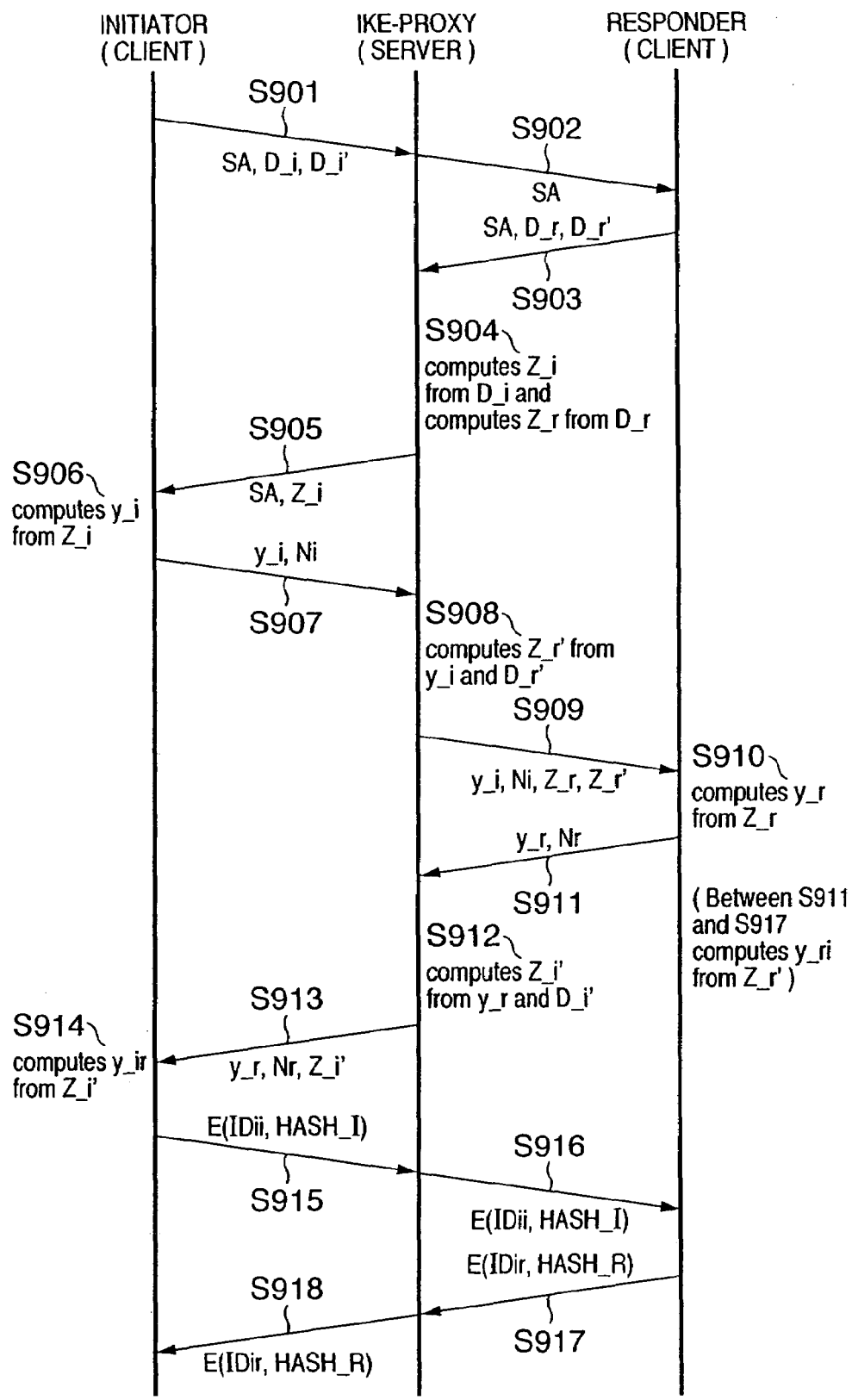
FIG. 9 is a view of an IKE-proxy protocol.

Referring to FIG. 9, both IKE data and SAC data are included in one data transfer. However, the same effect can also be obtained by simultaneously executing the two protocols in synchronism with each other, so the two data need not be included in one data transfer.

The initiator and responder set the IKE-proxy (server) as an IKE-proxy & SAC server. The initiator knows the address of the responder.

In step S901, the initiator determines parameters D_i, F_i, D_i', and F_i' of SAC, and sends SA proposals to the responder via the IKE-proxy. The initiator also sends D_i and D_i' to the IKE-proxy. The IKE-proxy receives D_i (the first request) and D_i' (the second request). Similar to FIG. 1, D_i (the first request) is a request for obtaining y__1st (the second data) from r__1st (the third data), and D_i' (the second request) is a request for obtaining y_ri (the first data) from r_init+r__1st (the sixth data) generated from r__1st (the third data) and r_init (the seventh data).

In step S902, the IKE-proxy relays the SA proposals (one or more security associations) from the initiator to the responder.

In step S903, the responder determines parameters D_r, F_r, D_r', and F_r' of SAC. The responder also selects one security association from the proposals, and sends the selected security association to the initiator via the IKE-proxy. In addition, the responder sends D_r and D_r' to the IKE-proxy.

In step S904, as in step S104 of FIG. 1, the IKE-proxy computes Z_i and Z_r, respectively, from D_i and D_r by using the selected security association (p and g are determined). That is, the IKE-proxy performs the first computation to obtain Z_i (the first computation result) in response to D_i (the first request).

In step S905, the IKE-proxy sends the selected security association and Z_i (the first computation result) to the initiator. In step S906, the initiator computes y_i from (F_i and) Z_i. This y_i is equivalent to y_A (=y_init*y__1st mod p) in step S106 of FIG. 1.

In step S907, the initiator sends y_i and Nonce Ni to the responder via the IKE-proxy.

In step S908, as in step S109 of FIG. 1, the IKE-proxy computes Z_r' (z_r'=(y_i)^(d_r') mod p) from y_i and D_r' which the IKE-proxy receives from the initiator (to relay them to the responder).

In step S909, the IKE-proxy relays y_i and Ni to the responder, and sends Z_r and Z_r' to the responder.

In step S910, the responder computes y_r from (F_r and) Z_r. This y_r is equivalent to y_A (=y_init*y__1st mod p) in step S106 of FIG. 1.

In step S911, the responder sends y_r and Nonce Nr to the initiator via the IKE-proxy.

Between steps S911 and S917, the responder computes y_ri from (F_r' and) Z_r', generates an encryption key on the basis of y_ri, and obtains HASH_R. This y_ri can be obtained in the same manner as y_AB in step S111 of FIG. 1.

In step S912, the IKE-proxy computes Z_i' (z_i'=(y_r)^(d_i') mod p) from y_r and D_i' which the IKE-proxy receives from the responder (to relay them to the initiator). That is, the IKE-proxy receives y_r (the 12th data) from the responder (communication partner), and, in response to D_i' (the second request), performs the second computation by using y_r (the 12th data) to obtain Z_i' (the second computation result).

In step S913, the IKE-proxy relays y_r and Nonce Nr to the initiator, and sends Z_i' (the second computation result) to the initiator.

In step S914, the initiator obtains y_ir from Z_i'. This y_ir can be obtained in the same manner as y_AB in step S111 of FIG. 1. The initiator generates an encryption key on the basis of y_ir, and obtains HASH_I. In step S915, the initiator sends encrypted data of identification payloads IDii and HASH_I to the responder via the IKE-proxy.

In step S916, the IKE-proxy relays the encrypted data of identification payloads IDii and HASH_I to the responder.

In step S917, the responder sends, to the initiator, data obtained by encrypting identification payloads IDir and HASH_R by using a key generated on the basis of y_ri.

In step S918, the IKE-proxy relays the encrypted data of identification payloads IDir and HASH_R to the initiator.

By using the above protocol, two IPv6 apparatuses having low computation capability can securely execute IKE while using the IKE-proxy as a SAC server. Note that even if the IKE-proxy tries to execute a man-in-the-middle-attack, this attack is detected by an authentication method (based on a pre-shared key or digital signature) executed during IKE, and fails.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2003-314000 filed on Sep. 5, 2003, which is hereby incorporated by reference herein.

What is claimed is:

1. A data sharing method of sharing first data with a communication partner, comprising:
    a first obtaining step of obtaining second data from third data by using server-aided computation;
    a generation step of generating fourth data to be used by the communication partner for obtaining the first data, from the second data and fifth data; and
    a second obtaining step of obtaining the first data to be shared with the communication partner from sixth data generated from the third data and seventh data,
    wherein, in the first obtaining step, ninth data is obtained by using server-aided computation on the basis of eighth data obtained from the third data by first conversion, and the second data is generated from the ninth data by using second conversion corresponding to the first conversion, and
    in the second obtaining step, eleventh data is obtained by using server-aided computation on the basis of tenth data obtained from the sixth data by third conversion, and the first data is generated from the eleventh data by using fourth conversion corresponding to the third conversion.

2. The method according to claim 1, wherein the second data is a residue obtained by dividing $g^{third\ data}$ (g to the "third data"th) by p, the fourth data is a residue obtained by dividing a product of the second and fifth data by p, the first data is a residue obtained by dividing twelfth data$^{sixth\ data}$ ("12th data" to the "sixth data"th) by p,
    the sixth data is a sum of the third and seventh data, and
    the fifth data is a residue obtained by dividing $g^{seventh\ data}$ (g to the "seventh data"th) by p,
    wherein the prime p and generator g are Diffie-Hellman parameters.

3. The method according to claim 1, wherein
    the second data is result of multiplication of a point P on an elliptic curve by the third data,
    the fourth data is result of addition of the second data on the elliptic curve and the fifth data on the elliptic curve, the first data is result of multiplication of the twelfth data on the elliptic curve by the sixth data, the sixth data is result of addition of the third and seventh data, and the fifth data is result of multiplication of the point P on the elliptic curve by the seventh data.

4. The method according to claim 1, wherein the second and third data for obtaining first shared data are used as the fifth and seventh data for obtaining second shared data.

5. The method according to claim 1, wherein the communication partner is requested to perform the server-aided computation for obtaining the second data from the third data, and the server-aided computation for obtaining the first data form the sixth data.

6. The method according to claim 1, wherein a server which exists on a path to the communication partner is requested to perform the server-aided computation for obtaining the second data from the third data, and the server-aided computation for obtaining the first data from the sixth data.

7. The method according to claim 1, wherein an encryption key used in communication with the communication partner is generated on the basis of the first data.

8. A data sharing apparatus for sharing first data with a communication partner, the apparatus comprising:
a processor; and
a computer-readable storage medium storing a computer program, the program comprising computer-executable code that, when executed by the processor, performs the steps of:
a first obtaining step of obtaining second data from third data by using server-aided computation;
a generation step of generating fourth data to be used by the communication partner for obtaining the first data, from the second data and fifth data; and
a second obtaining step of obtaining the first data to be shared with said communication partner from sixth data generated from the third data and seventh data,
wherein in the first obtaining step, ninth data is obtained by using server-aided computation on the basis of eighth data obtained from the third data by first conversion, and the second data is generated from the ninth data by using second conversion corresponding to the first conversion, and,
in the second obtaining step, eleventh data is obtained by using server-aided computation on the basis of tenth data obtained from the sixth data by third conversion, and the first data is generated from the eleventh data by using fourth conversion corresponding to the third conversion.

9. The apparatus according to claim 8, wherein
the second data is a residue obtained by dividing $g^{third\ data}$ (g to the "third data"th) by p,
the fourth data is a residue obtained by dividing a product of the second and fifth data by p,
the first data is a residue obtained by dividing twelfth data$^{sixth\ data}$ ("12th data" to the "sixth data"th) by p,
the sixth data is a sum of the third and seventh data, and
the fifth data is a residue obtained by dividing $g^{seventh\ data}$ (g to the "seventh data"th) by p,
wherein the prime p and the generator g are Diffie-Hellman parameters.

10. The apparatus according to claim 8, wherein
the second data is result of multiplication of a point P on an elliptic curve by the third data,
the fourth data is result of addition of the second data on the elliptic curve and the fifth data on the elliptic curve,
the first data is result of multiplication of the twelfth data on the elliptic curve by the sixth data,
the sixth data is result of addition of the third and seventh data, and the fifth data is result of multiplication of the point P on the elliptic curve by the seventh data.

11. The apparatus according to claim 8, wherein the second and third data for obtaining first shared data are used as the fifth and seventh data for obtaining second shared data.

12. The apparatus according to claim 8, wherein an encryption key used in communication with said communication partner is generated on the basis of the first data.

13. A computer-readable storage medium having stored thereon a data sharing program for sharing first data with a communication partner, when executed by a computer to perform a method comprising:
a first obtaining step of obtaining second data from third data by using server-aided computation;
a generation step of generating fourth data to be used by the communication partner for obtaining the first data, from the second data and fifth data; and
a second obtaining step of obtaining the first data to be shared with the communication partner from sixth data generated from the third data and seventh data,
wherein, in the first obtaining step, ninth data is obtained by using server-aided computation on the basis of eighth data obtained from the third data by first conversion, and the second data is generated from the ninth data by using second conversion corresponding to the first conversion, and
in the second obtaining step, eleventh data is obtained by using server-aided computation on the basis of tenth data obtained from the sixth data by third conversion, and the first data is generated from the eleventh data by using fourth conversion corresponding to the third conversion.

14. The computer-readable storage medium according to claim 13, wherein the second data is a residue obtained by dividing $g^{third\ data}$ (g to the "third data"th) by p,
the fourth data is a residue obtained by dividing a product of the second and fifth data by p,
the first data is a residue obtained by dividing twelfth data$^{sixth\ data}$ ("12th data" to the "sixth data"th) by p,
the sixth data is a sum of the third and seventh data, and
the fifth data is a residue obtained by dividing $g^{seventh\ data}$ (g to the "seventh data"th) by p,
wherein the prime p and generator g are Diffie-Hellman parameters.

15. The computer-readable storage medium according to claim 13, wherein
the second data is result of multiplication of a point P on an elliptic curve by the third data,
the fourth data is result of addition of the second data on the elliptic curve and the fifth data on the elliptic curve,
the first data is result of multiplication of the twelfth data on the elliptic curve by the sixth data,
the sixth data is result of addition of the third and seventh data, and
the fifth data is result of multiplication of the point P on the elliptic curve by the seventh data.

16. The computer-readable storage medium according to claim 13, wherein the second and third data for obtaining first shared data are used as the fifth and seventh data for obtaining second shared data.

17. The computer-readable storage medium according to claim 13, wherein an encryption key used in communication with the communication partner is generated on the basis of the first data.

* * * * *

UNITED STATES PATENT AND TRADEMARK OFFICE
CERTIFICATE OF CORRECTION

PATENT NO. : 7,370,070 B2  
APPLICATION NO. : 10/930958  
DATED : May 6, 2008  
INVENTOR(S) : Oishi Page 1 of 1

It is certified that error appears in the above-identified patent and that said Letters Patent is hereby corrected as shown below:

COLUMN 1:
Line 54, "such" should read -- schemes such --.

COLUMN 2:
Line 53, "multiplication" should read -- multiplications --.

COLUMN 9:
Line 7, "is" (second occurrence) should read -- and is --.

COLUMN 12:
Line 23, "is" should read -- are --.

COLUMN 15:
Line 12, "a" should read -- of a --.

COLUMN 19:
Line 12, "form" should read -- from --.

Signed and Sealed this

Twenty-eighth Day of October, 2008

JON W. DUDAS  
*Director of the United States Patent and Trademark Office*